(12) United States Patent
McMurtry et al.

(10) Patent No.: US 7,100,297 B2
(45) Date of Patent: Sep. 5, 2006

(54) PROBE OR STYLUS ORIENTATION

(75) Inventors: David Roberts McMurtry, Dursley (GB); Geoffrey McFarland, Dursley (GB)

(73) Assignee: Renishaw PLC, Gloucestershire (GB)

( * ) Notice: Subject to any disclaimer, the term of this patent is extended or adjusted under 35 U.S.C. 154(b) by 67 days.

(21) Appl. No.: 10/517,660

(22) PCT Filed: Jul. 1, 2003

(86) PCT No.: PCT/GB03/02810

§ 371 (c)(1),
(2), (4) Date: Dec. 13, 2004

(87) PCT Pub. No.: WO2004/003466

PCT Pub. Date: Jan. 8, 2004

(65) Prior Publication Data

US 2005/0256672 A1    Nov. 17, 2005

(30) Foreign Application Priority Data

Jul. 1, 2002 (GB) .................................. 0215152.0

(51) Int. Cl.
*G01B 3/00* (2006.01)

(52) U.S. Cl. ........................... 33/556; 33/558; 33/559; 33/561

(58) Field of Classification Search ................. 33/556, 33/558, 559, 561
See application file for complete search history.

(56) References Cited

U.S. PATENT DOCUMENTS

| | | | |
|---|---|---|---|
| 4,168,576 A | 9/1979 | McMurtry | |
| 4,485,453 A | 11/1984 | Taylor | |
| 4,523,450 A * | 6/1985 | Herzog | ....................... 73/1.81 |
| 4,523,540 A | 6/1985 | Walter | |
| 4,571,847 A | 2/1986 | McMurtry | |
| 4,777,818 A * | 10/1988 | McMurtry | ................... 73/1.79 |
| 4,884,348 A | 12/1989 | Zeller et al. | |
| 4,888,877 A * | 12/1989 | Enderle et al. | ................ 33/559 |
| 5,083,379 A | 1/1992 | Enderle et al. | |
| 5,125,261 A * | 6/1992 | Powley | ........................ 73/1.81 |
| 5,430,948 A | 7/1995 | Vander Wal, III | |
| 5,848,477 A | 12/1998 | Wiedmann et al. | |
| 6,516,529 B1 * | 2/2003 | Hidaka et al. | ................. 33/561 |
| 2004/0163268 A1 * | 8/2004 | McMurtry et al. | ............. 33/556 |

FOREIGN PATENT DOCUMENTS

| | | |
|---|---|---|
| EP | 0 389 108 A2 | 9/1990 |
| EP | 1 262 733 A2 | 12/2002 |
| WO | WO 99/54680 | 10/1999 |
| WO | WO 02/101329 A1 | 12/2002 |

* cited by examiner

*Primary Examiner*—Yaritza Guadalupe-McCall
(74) *Attorney, Agent, or Firm*—Oliff & Berridge, PLC

(57) ABSTRACT

Re-orientation of a stylus (30) or measurement probe (12) can be accomplished by engaging a part of the stylus or probe with a fixed part (50) and moving the probe in a spherical path centred at the engagement. The engagement (50) is spaced from the stylus tip (34) and avoids bending of the stylus during re-orientation. The re-orientation can take place into a plurality of e.g. repeatable rest positions by virtue of a kinematic array (e.g. balls (122) and rollers (120) FIG. 2).

18 Claims, 8 Drawing Sheets

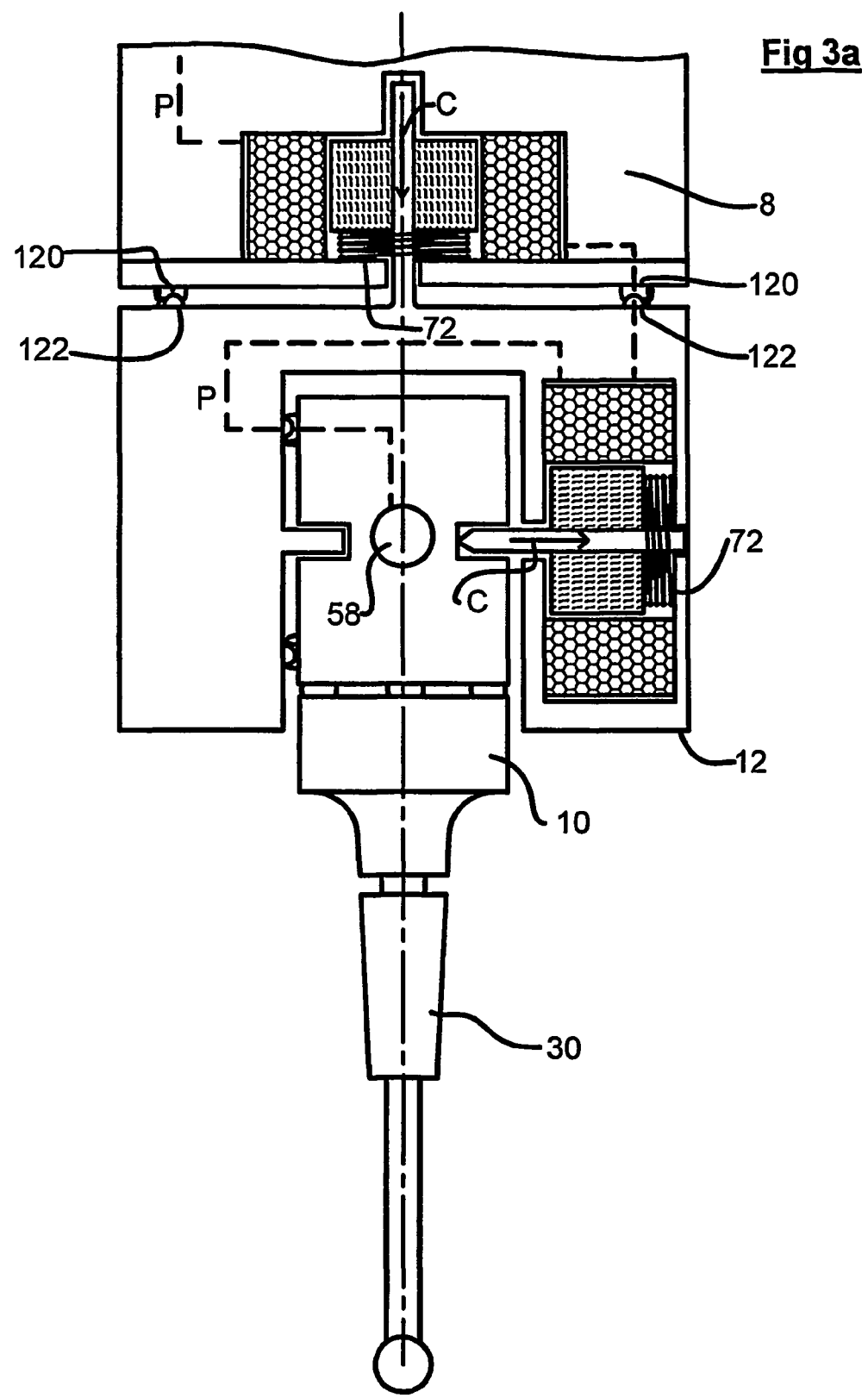

PROBE OR STYLUS ORIENTATION

The present invention relates to the orientation of a stylus of a measurement type probe e.g. as used on a coordinate positioning machine, brought about by the movement of part of the probe whilst inhibiting movement of the stylus part.

Our co-pending application PCT/GB02/02460 filed 13th Jun. 2002 relates to such stylus or probe orientation, and its disclosure is incorporated herein in its entirety by reference. Stylus orientation is also disclosed in prior patent U.S. Pat. No. 4,571,847 and the entirety of the disclosure in that patent is incorporated herein by reference also.

It is common practice to measure a workpiece on a coordinate measurement machine using a probe on a motor driven or manually movable support. The probe produces a signal when touching the surface of a workpiece, this signal is used to record the coordinate position of the stylus. It is often desirable to reorientate a stylus mounted on a measurement probe.

If, for example, it is required to determine the dimensions of a horizontal surface of a workpiece and also a horizontally extending bore in that workpiece, then the stylus may need to be repositioned. There are a number of ways in which this can be done. Possibly a different stylus can be used for each of the surface and bore inspections, or as is desirable the stylus can be repositioned into a new position. Repositioning can be effected by motors within the probe. Alternatively, repositioning can be effected by restraining some part of the stylus and moving the probe support to reorientate the stylus. A device of this latter type is disclosed in U.S. Pat. No. 5,848,477.

Disclosure of another reorientation technique is made in our U.S. Pat. No. 4,168,576. That document discloses the reorientation of a probe extension arm relative to an articulating probe head by means of driving the arm into abutment with a fixed object. The arm is mounted on a pivotable joint and is forcibly repositioned about the pivot when driven into the fixed object. One pivotable joint disclosed provides friction so that the newly orientated stylus stem stays in position. Another joint disclosed latches the stylus into position. The extension arm slides over its abutment. Recalibration is required after each reorientation because the position of a stylus tip attached to the arm is not known following reorientation. Force exerted on the arm during reorientation will cause the arm to bend and so the recalibration is required.

Simple devices are disclosed in U.S. Pat. No. 4,523,450 and European Patent No. 0389108. In those documents a stylus ball is pushed into a receptacle to provide calibration of the actual stylus tip position. U.S. Pat. No. 4,523,450 proposes a stylus mounted on a swingable joint which is pushed into a three-faced recess in order to determine its position.

U.S. Pat. No. 5,848,477 also discloses a drive control for moving a stylus tip into a recess and then moving the head whilst the tip hopefully remains centred in the recess. Bending forces are again induced in the stylus when reorientation takes place.

None of the prior art addresses the problem of having to recalibrate the stylus tip following re-orientation.

According to the present invention there is provided a coordinate measurement machine comprising:
a first part and a second part, the second part being movable relative to the first part;
a measurement device having a stylus and stylus tip;
a joint for interconnecting the measurement device and the second part, the joint comprising at least one rotatable member rotatably repositionable relative to the second part;
an engagement comprising two mutually engageable portions, one on the first part and one on the rotatable member;
wherein a first one of said portions of the engagement comprises a holder for holding the other one of said portions in engagement therewith; and wherein
the said one of the portions of the engagement on the rotatable member is spaced from the stylus tip.

According to a second aspect of the invention there is provided a measurement device comprising:
a stylus and a stylus tip;
a movable joint for connecting the stylus to a support the joint having a movable member;
a stylus repositioning device; and
an engagement comprising two mutually engageable portions, one on the movable member and one on the stylus repositioning device;
wherein a first one of the said portions of the engagement comprises a holder for holding the other one of the said portions in engagement therewith and wherein the said of the portions of the engagement on the rotatable member is spaced from the stylus tip.

The invention extends a method of reorientating a measurement device mounted to a coordinate measurement machine, the coordinate measurement machine having:
a first part and a second part being movable relative to the first part; and
a first portion of an engagement;
the measurement device having:
a stylus and a stylus tip;
a joint for interconnecting the stylus with the second part and for reorientating the stylus;
the measurement device further comprising a second portion of an engagement for mutual engagement with the first portion;
one of the two portions of the engagement comprising a holder for holding the other one of the said portions in engagement therewith, the second portion of the engagement being spaced from the stylus tip, the method comprising:
moving the first and second parts in order to engage the first and second portions of the engagement;
moving the second part relative to the first part in a path centred on the engagement thereby to reposition the stylus relative to the first and second parts; and
disengaging the first and second portions of the engagement by relative movement of the first and second parts.

The invention will now be described with reference to the accompanying drawings, wherein.

Figure 1:
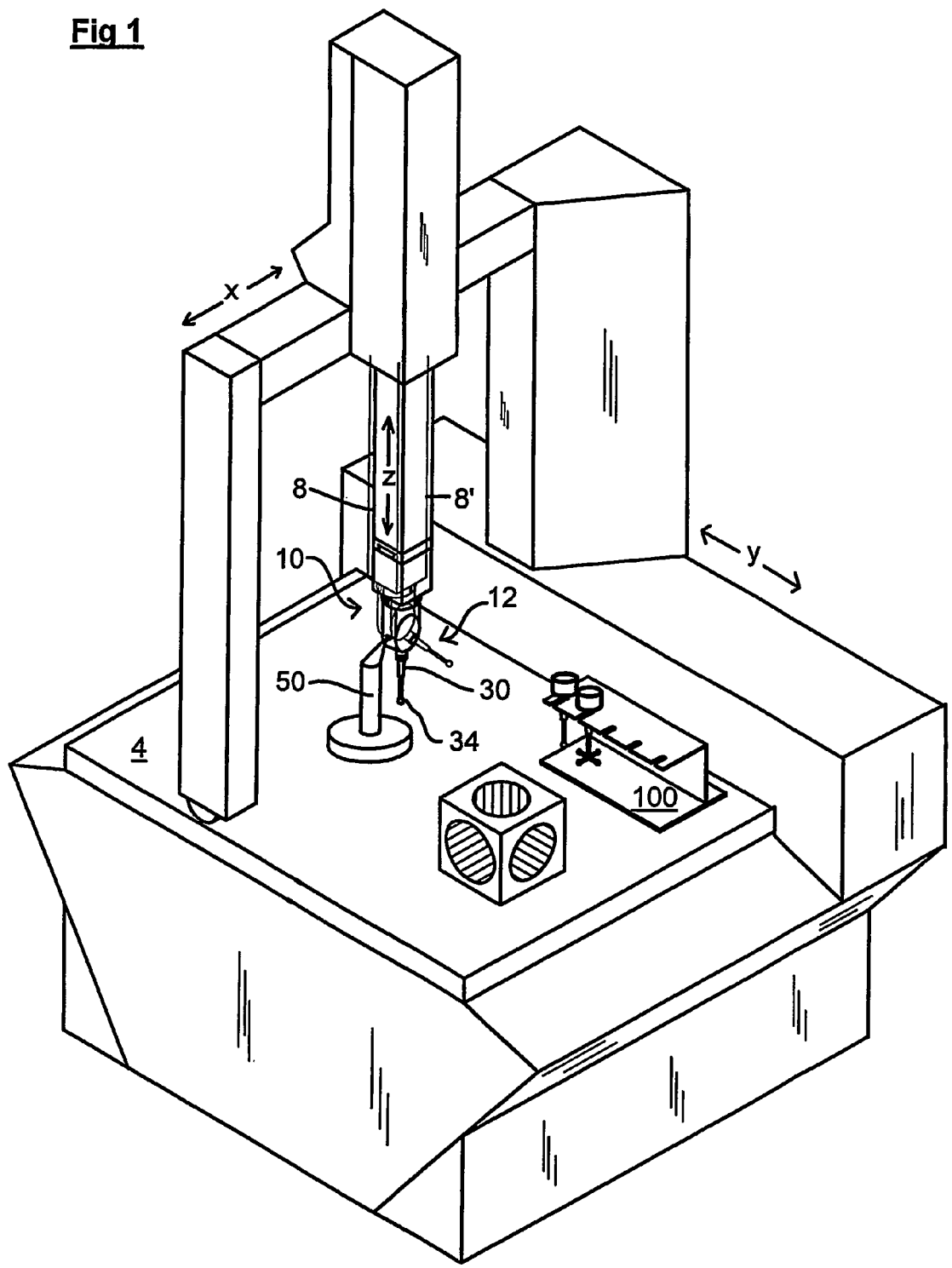
FIG. 1 shows a coordinate measurement machine for employing embodiments of the invention.

FIG. 1 shows a typical coordinate measurement machine 2 (CMM) capable of moving a probe 10 in X,Y and Z axes. Typically when measuring a workpiece component 5 the probe 10 together with a stylus 30 held in stylus holder 12 is moved towards the surface of the workpiece until a stylus tip 34 touches the workpiece. At that instant the probe 10 produces a signal to stop the movement of the probe and to record the coordinate position of the stylus tip. From this information dimensions of the workpiece can be determined. Desirably all dimensions of the features of the workpiece need to be determined in one operation without moving the workpiece. This can be achieved as described above, either by using different styli, or reorientating the stylus.

Embodiments of this invention concern the reorientation/repositioning of the stylus by holding a stylus part whilst moving the machine's quill 8 using the motors of the coordinate measurement machine. In FIG. 1 the probe support is illustrated in a second position 8'. Stylus 30 is held by a stylus repositioning device 50 whilst the quill is moved from 8 to 8'. This movement will involve adjustments to the probe support in two or possibly three axes. Further reorientation of the stylus holder 12 will, in the example illustrated in FIG. 1, enable the dimensions of the three bores in the workpiece 5 to be inspected.

Figure 2:
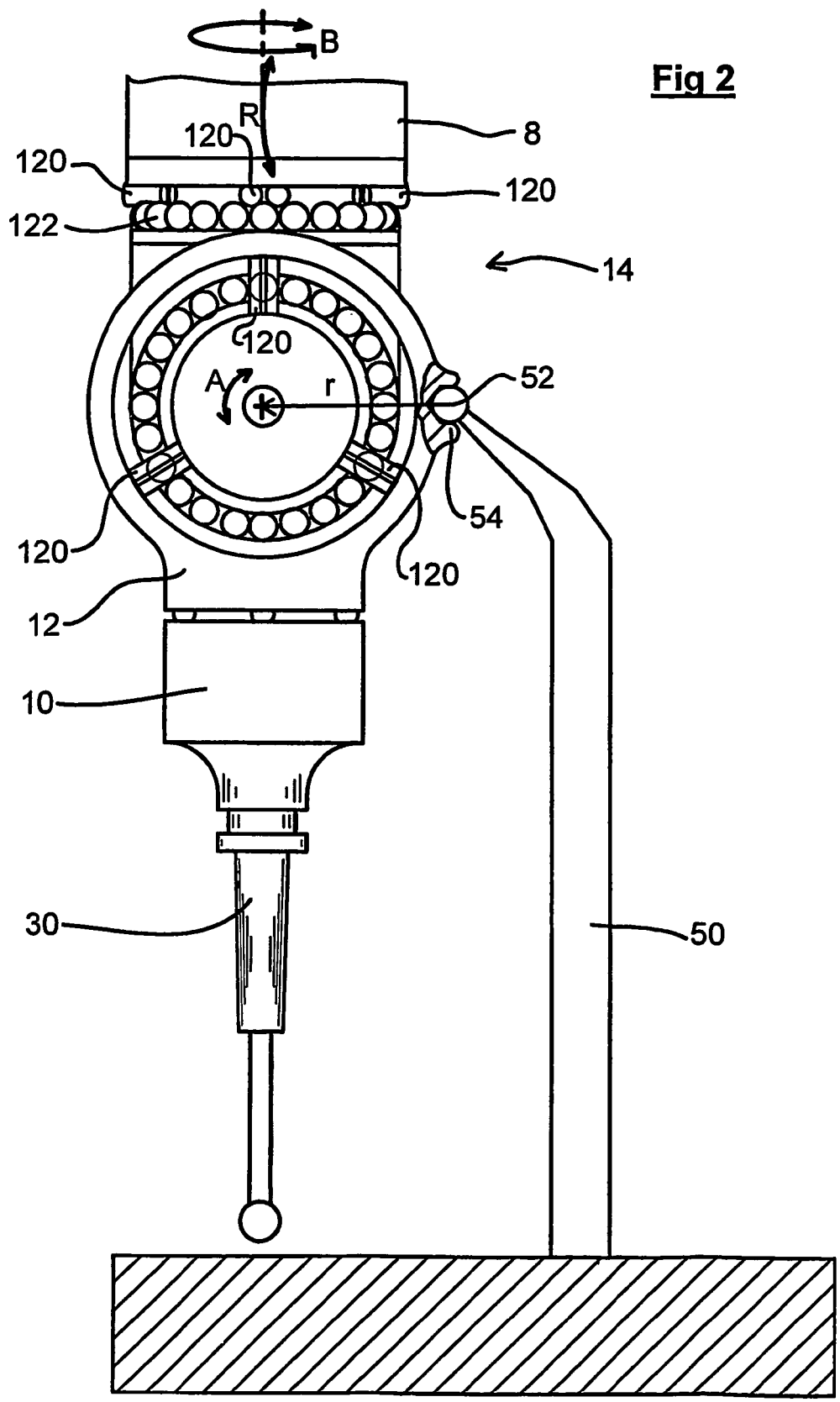
FIG. 2 shows a probe assembly and a stylus repositioning device.

One type of measurement probe arrangement which has a repositionable stylus is illustrated in more detail in FIG. 2. The Figure shows a probe head 14 which has the features described in U.S. Pat. No. 4,571,847 the disclosure of which forms part of this application. In brief this head supports movably a probe 10. Stylus 30 is connected to the probe 10, and both probe and stylus are repositionable to a number of pre-selected repeatable positions relative to the quill 8.

Probe support 12 may be rotated about axis A and has three sets of roller pairs 120, each pair being engageable with opposite sides of one of a ring of balls 122. Thus a total of six contact points are made and rotational increments of the probe support 12 equal to the angular ball spacing are possible (15 degrees in this case). A similar arrangement is provided for rotation of the probe support about axis B. The balls and rollers are biased into engagement by springs so that their relative position is maintained in use. The spring bias can be overcome readily for repositioning.

The stylus 30 (together with the probe 10 in this instance) can be repositioned by obstructing the probe support 12 whilst moving the quill 8. Obstruction of the support 12 is brought about in this example by use of a stylus repositioning device 50.

The device 50 is held stationary and has a ball 52 engageable with a receptacle 54 in the probe support 12. The ball 52 and receptacle 54 form first and second mutually engageable portions of an engagement. When the quill is driven in an arc or spherical path R having a radius r (equal to the distance between the centre of the ball 52 and the axis A) then repositioning of the stylus 30 is possible in x,y and z axes, in this instance in any of the selected 15 degree rotational increments.

Figure 3:
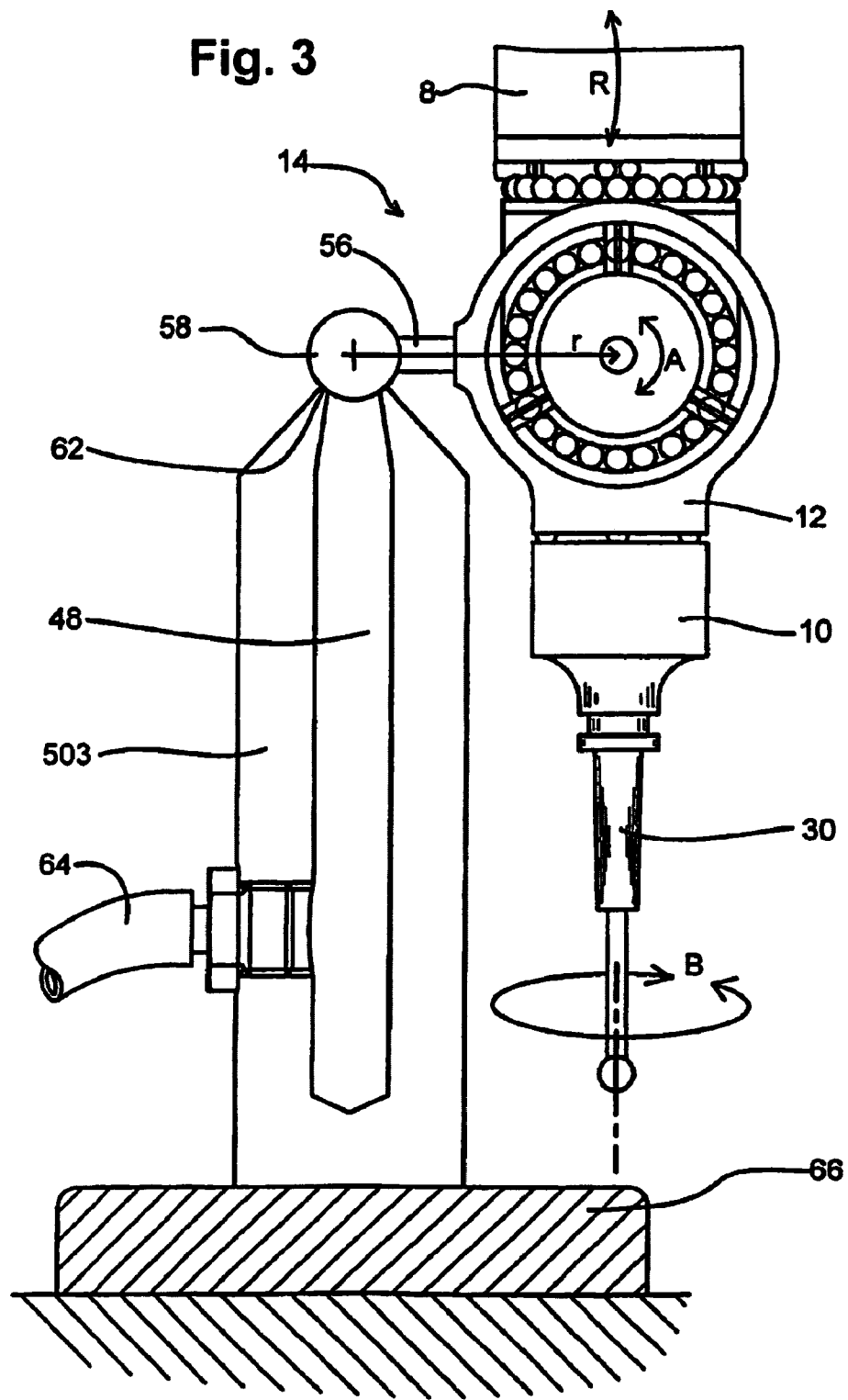
FIG. 3 shows the probe assembly of FIG. 2 and a further stylus repositioning device.

A similar head 14, probe 10 and stylus 12 are shown in FIG. 3. The head is modified such that the receptacle is replaced with a stalk 56 and ball 58. A different stylus repositioning device 503 is shown.

In use the repositioning device 503 holds the ball 58 whilst movement of the quill 8 in an arc R takes place. This movement is centred about the ball 58. The device 503 comprises a conduit 48 within a body 60. At one end of the conduit is a lip 62 which forms a datum surface for holding the ball 58. Ball 58 and lip 62 form first and second mutually engageable portions of an engagement. Within the conduit 48 there is induced a vacuum which is provided by a vacuum tube 64. The body 60 is mounted to a base 66 which can be fixed to the bed 4 of the coordinate measurement machine 2.

During repositioning, the ball 58 is moved into contact with the lip 62 and a vacuum is generated within the conduit 48. This vacuum holds the ball 58 against the lip 62 whilst the probe support 12 is repositioned about axis A and/or B.

FIG. 3a shows a variant of the probe assembly shown in FIG. 3. In this variant the roller pairs 120 and balls 122 (only four of which are illustrated) as well as being brought into engagement by springs 72, are caused to separate by the action of solenoids 74 acting in the direction of arrows C.

Parting of the ball and roller sets provides less resistance to reorientation. Activation of the solenoids can be via an instruction from the CMM, both solenoids 74 can be operated together or the solenoids can be operated singly. In this instance the solenoids are energised via an electrical path P which runs from a supply at the quill 8, through both solenoids and through the repositioning device 503 or 50 via ball 58. In operation the act of contacting the repositioning device energises the solenoids and separates the balls and rollers. Other separation systems are possible e.g. mechanical or vacuum types.

Figure 4:
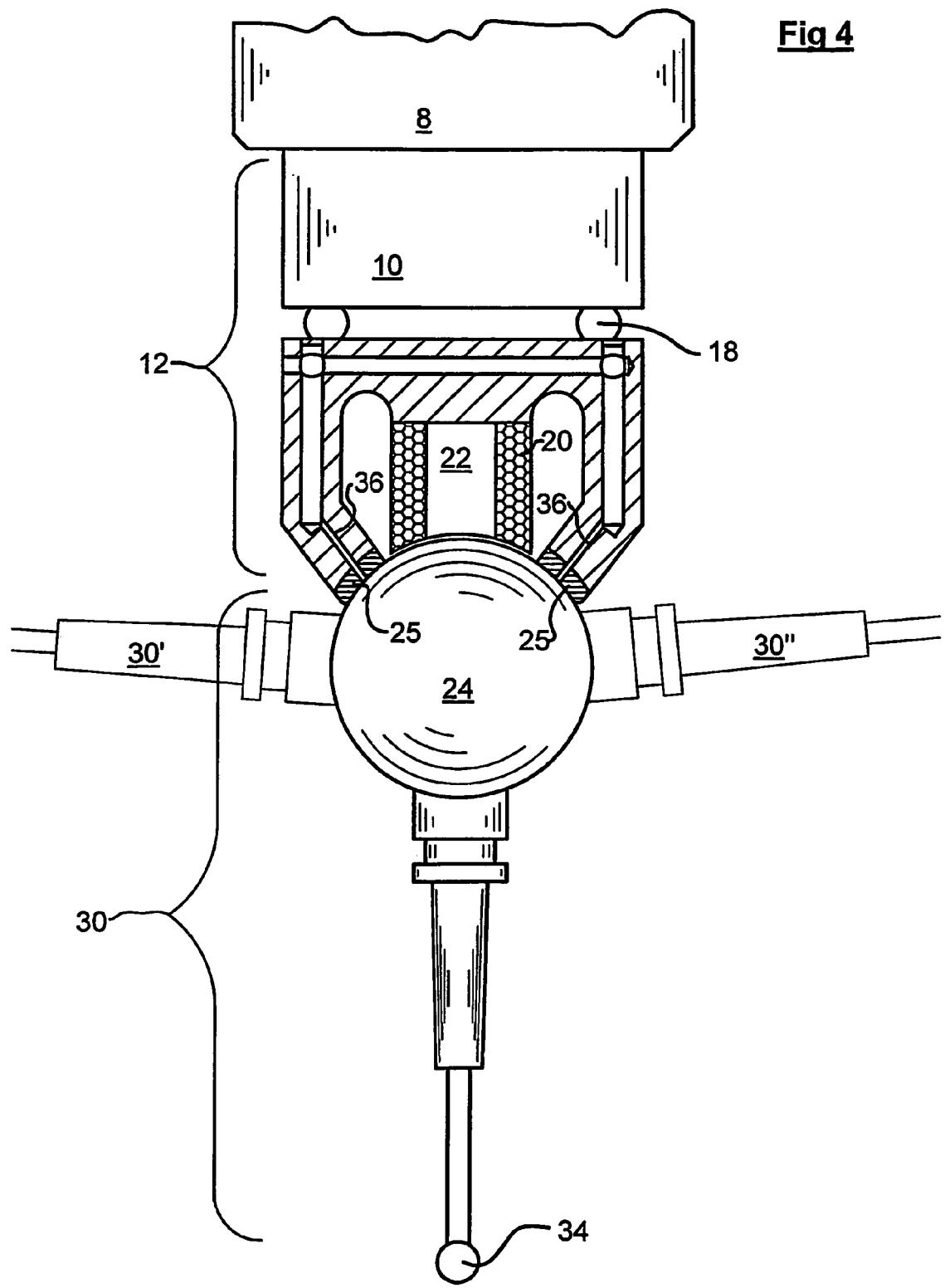
FIGS. 4 and 5 show probes which are the subject of patent application PCT/GB02/02460.
Figure 5:
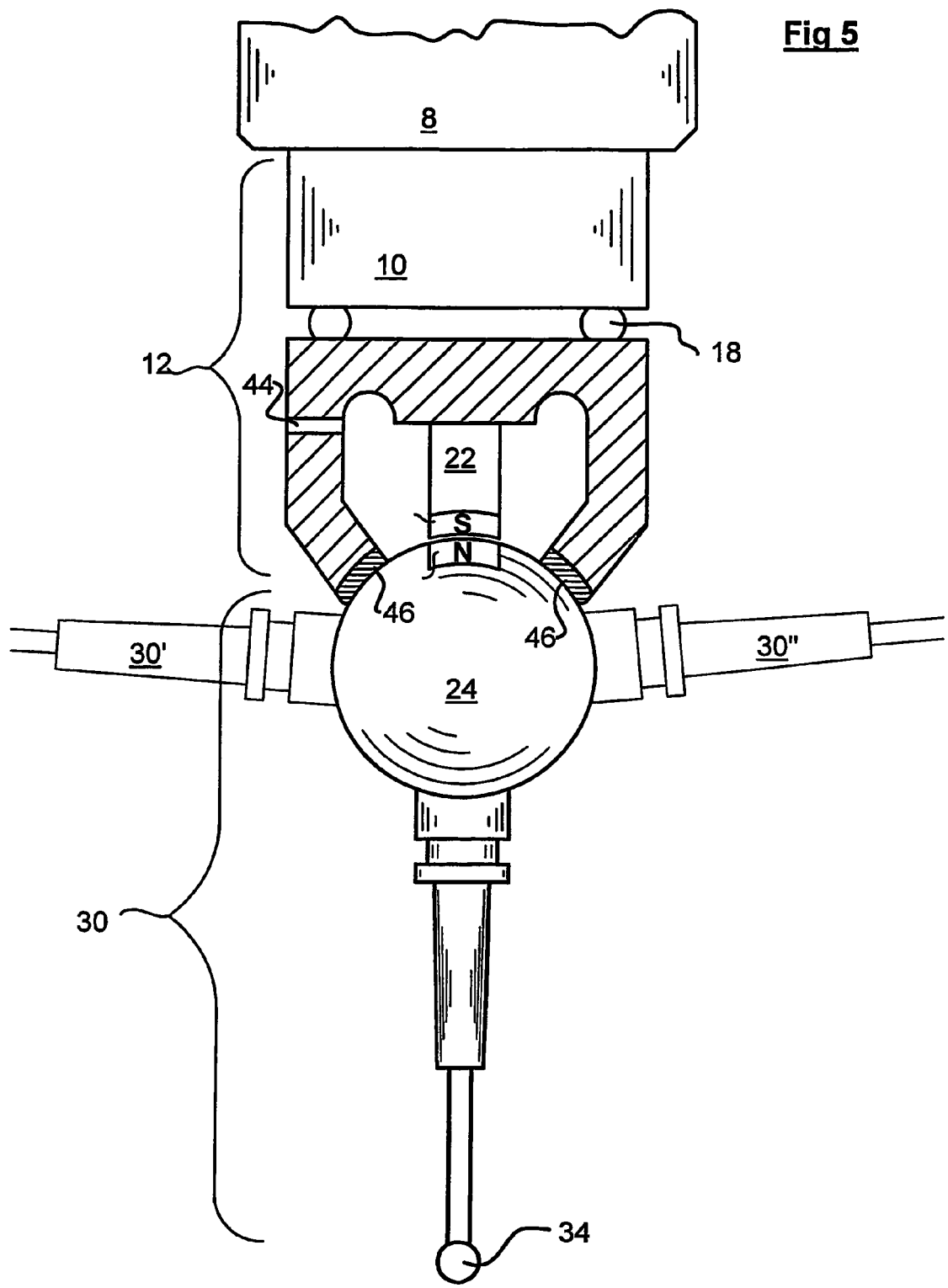

FIGS. 4 and 5 show a variant of the head 14 shown in FIGS. 2 and 3. In this variant the stylus 30 is movable about a stylus holder 12' and the probe 10 is fixed in relation to the quill 8.

FIG. 4 shows a probe 10 which produces a signal to stop the coordinate measurement machine when stylus tip 34 touches a surface. Also shown is a movable stylus 30 which may swing in any direction by virtue of a universal joint formed between cup-shaped bearing surfaces 25 and ball 24. The stylus holder 12' is normally held in place but is free, when released, to swing in a part-spherical manner to bring the stylus into positions within the limits shown by the feint outlines 30' and 30" (i.e. greater than hemispherical movement). Optionally the probe assembly includes a kinematic joint 18 connecting the probe 10 and stylus holder 12'.

During measurement ball 24 is held statically in place in contact with bearing surfaces 25 by the attractive force of a magnet 22. An electromagnet 20 is shown also which may provide additional attraction to hold the ball 24 in place. The ball 24 may be made of ferrous material, or a hollow ceramic body filled with ferrous fluent material. Bearing surfaces 25 may be three pads of ceramic material.

As the quill 8 is moved, to reduce friction at the universal joint and thereby to avoid bending moments in the stylus 30, the magnetic attraction between ball 24 and magnet 22 may be reduced by inducing an opposite field in electromagnet 20. Optionally the electromagnet may be pulsed or the current may be alternated to provide vibrations between the support 12 and the ball 24. These vibrations will reduce the friction in the universal joint. An optional air supply 38 is shown for feeding jets 36. These air jets 36 provide a low friction universal joint, when operated. Where an air supply is provided on the machine this may be used to supply pressurised air via conduit 38 to air jets 36 whilst movement of the universal joint takes place. This air supply will cause a fluid film to form between the surface of the ball 24 and the bearing surfaces 25 and will thereby reduce the friction between the two. The fluid film may replace or augment the electromagnetic friction reducing effects mentioned above.

When movement to the correct orientation has taken place the current in the electromagnet 20 may be switched off or reversed, and/or the air supply discontinued. The stylus 30 will thus be repositioned and ready for use.

FIG. 5 shows a similar probe assembly to that shown in FIG. 4. In this arrangement electromagnet 20 and magnet 22 are replaced by a vacuum chamber 42. Vacuum is induced via a conduit 44. In this embodiment a part-spherical bearing surface 46 is provided.

During measurement a vacuum is held in the chamber 42, to hold the stylus 30 in place, in static relation to the stylus support 12'.

When reorientation of the stylus 30 is required the pressure within the chamber 42 is increased so as to reduce the holding force on the ball 24. Once reorientation has taken place the pressure in the chamber 42 is reduced once more. Optionally (not shown) an electromagnet and/or air bearings may be used to reduce friction, as described above. Ball 24 need not be of a magnetic/magnetisable material if a vacuum is used solely.

Figure 6:
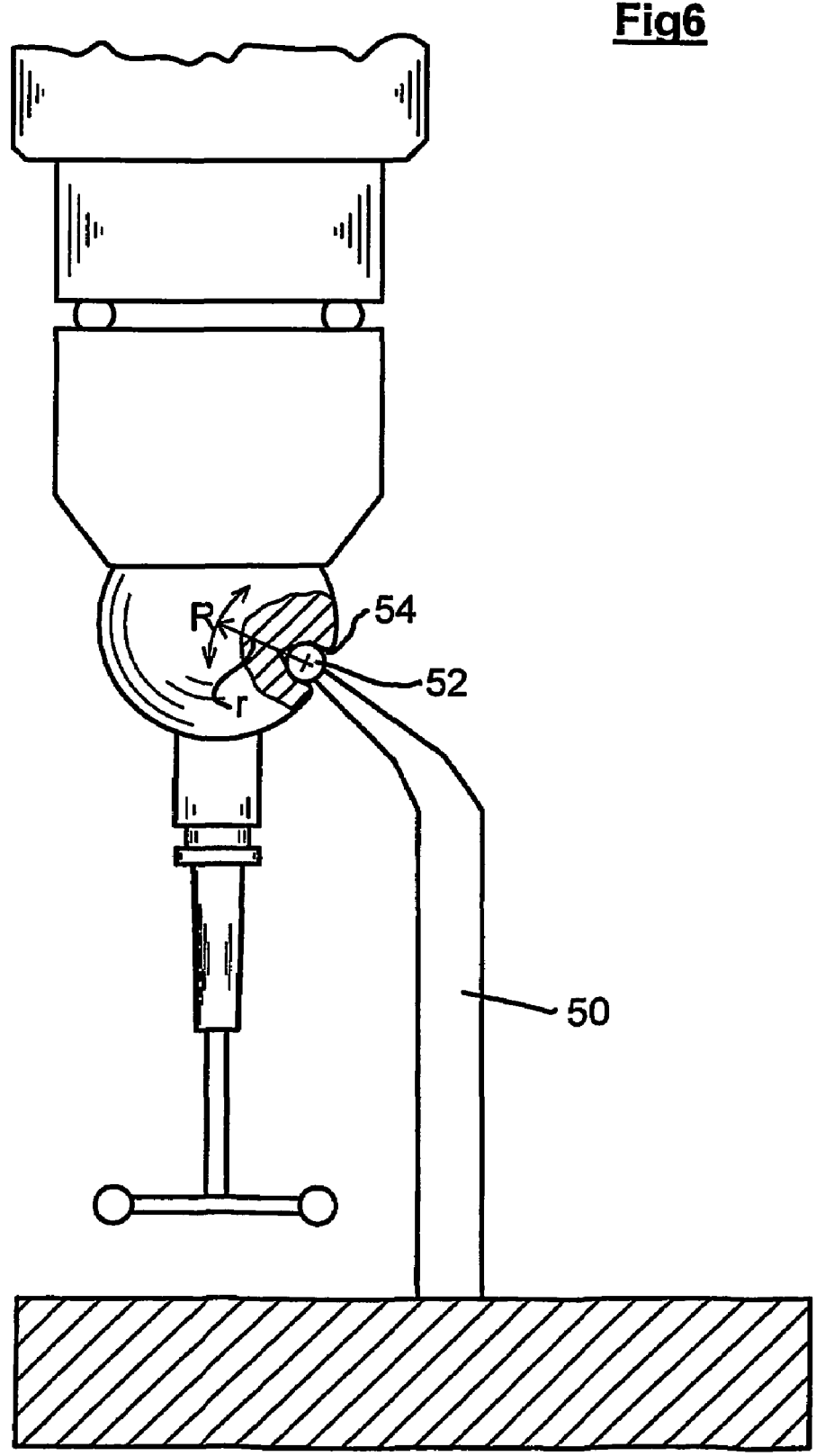
FIG. 6 shows the probe of either FIG. 4 or 5 and further stylus repositioning device.
Figure 7:
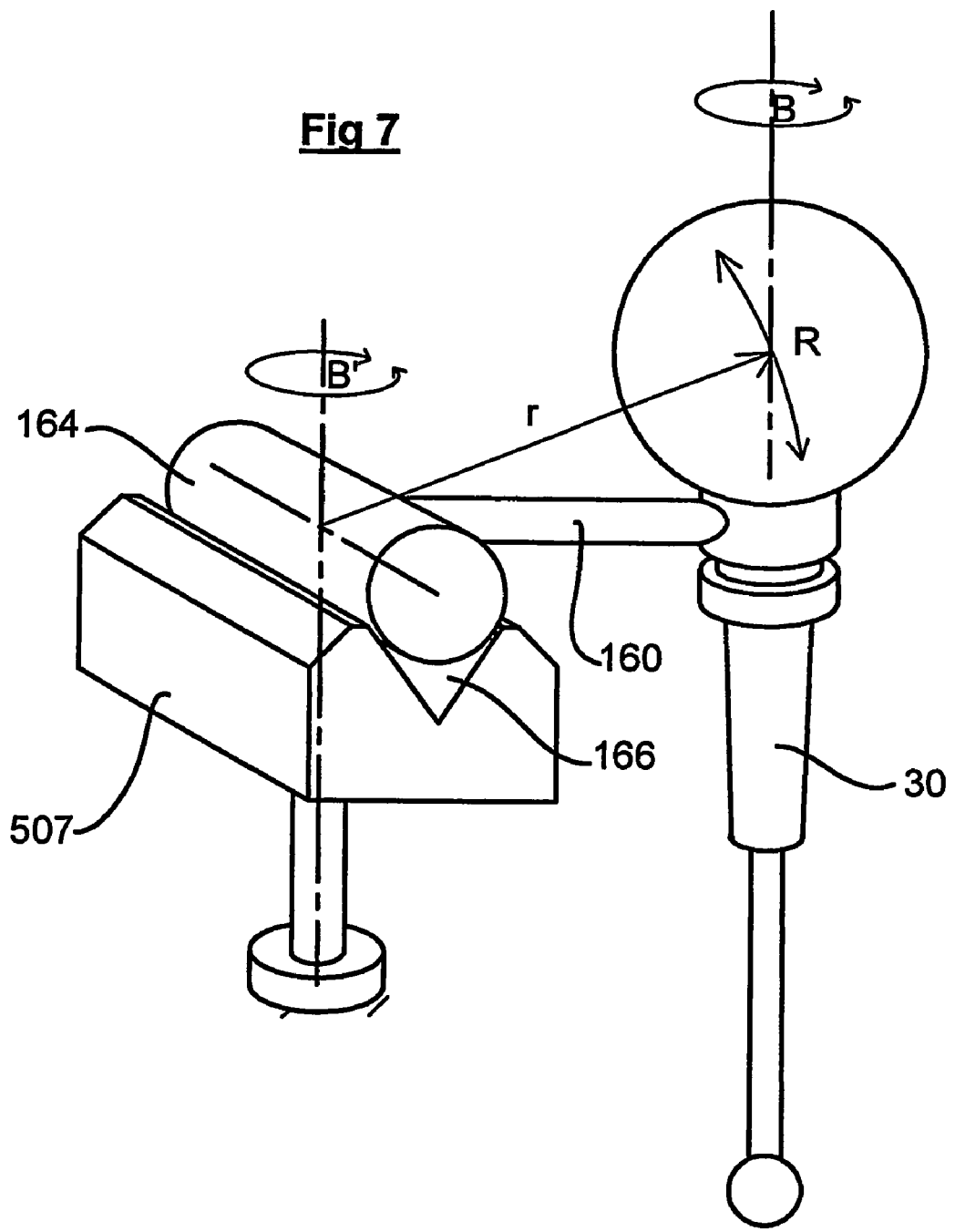
FIG. 7 shows a stylus which is a modified version of the stylus illustrated in FIGS. 4 and 5 together with another stylus repositioning device.

FIGS. 6 and 7 shows two possible modifications of the styli 30 illustrated in FIGS. 4 and 5 which may be used in order that these styli may be repositionable using the quill 8 as a driving force.

In FIG. 6 a receptacle 54' similar to the receptacle 54 illustrated in FIG. 2 is used. A stylus repositioning device 50 is used. The repositioning technique is as described with reference to FIG. 2; In this instance the path R again has a radius r.

FIG. 7 shows another possible modification. A stalk 160 is attached to the stylus 30 and a cylinder 164 is attached to the stalk. The cylinder 164 is engageable with a rotatable stylus repositioning device 507. The device has a vee slot 66 for accepting the cylinder and for holding it by means of magnetism. Repositioning of the stylus is performed by moving the quill 8 as described above in a path R which has a radius r. Movement of the quill about a centre of rotation coincident with the centre of rotation B' of the device 507 allows further repositioning of the stylus 30 about axis B.

Exchange of one stylus 30 for another into or out of rack 100 (FIG. 1) is described in detail in PCT/GB02/02460. At any time during an inspection operation the stylus 30 can be repositioned, for example after being knocked accidentally out of place, by reducing the friction between the ball 24 and bearing surfaces 40 or 46. Reducing the friction sufficiently will allow the stylus to hang down vertically or at a known angle. The stylus can then be reorientated to an exact position for example using the device 50 or 507.

The description refers to a vacuum. Herein this word encompasses any fluid pressure which is lower than ambient or a complete vacuum.

The description and drawings relating to FIGS. 4, 5, 6 and 7 show a ball and cup type universal joint. However any universal joint having a convexity and an element be to received around the convexity, or a concavity and an element to be received into the concavity will suffice as an alternative. E.g. a large ball (the convexity) nestable within three smaller spaced balls, or a cup (a concavity) as one piece of the joint and three balls in fixed relation to be received into the cup. An array of contact points arranged to provide an effective concave on convex spherical pattern could be used on an equivalent concave or convex spherical surface.

Balls 122 and rollers 120 have been shown in FIGS. 2, 3 and 3a. Any kinematic arrangement could be used instead of this arrangement, in order to provide a plurality of repeatable positions, e.g. an array of radially extending vee slots and three mating balls.

A conventional CMM has been shown in FIG. 1, however, "coordinate measurement machine" as used herein is intended to encompass any machine capable of determining co-ordinates, Cartesian or otherwise, e.g. a machine tool or a robotic arm having position determination.

The invention claimed is:

1. A coordinate measurement machine comprising:
   a first part and a second part, the second part being movable relative to the first part;
   a measurement device having a stylus and stylus tip;
   a joint for interconnecting the measurement device and the second part, the joint comprising at least one rotatable member rotatably repositionable relative to the second part;
   an engagement comprising two mutually engageable portions, one on the first part and one on the rotatable member;
   wherein a first one of said portions of the engagement comprises a holder for holding the other one of said portions in engagement therewith; and wherein
   the said one of the portions of the engagement on the rotatable member is spaced from the stylus tip.

2. A coordinate measurement machine as claimed in claim 1 wherein the rotatable member is repositionable to a plurality of repeatable positions.

3. A coordinate measurement machine as claimed in claim 1 wherein the said other one of the portions of the engagement comprises a spherical surface and the holder comprises a spherical surface accepting area.

4. A coordinate measurement machine as claimed in claim 3 wherein the spherical surface is formed on the rotatable member and the holder is formed on the first part.

5. A coordinate measurement machine as claimed in claim 4 wherein the holder includes a vacuum conduit.

6. A coordinate measurement machine as claimed in claim 3 wherein the spherical surface is formed on the first part and the holder is formed on the rotatable member.

7. A measurement device comprising:
   a stylus and a stylus tip;
   a movable joint for connecting the stylus to a support the joint having a movable member;
   a stylus repositioning device; and
   an engagement comprising two mutually engageable portions, one on the movable member and one on the stylus repositioning device;
   wherein a first one of the said portions of the engagement comprises a holder for holding the other one of the said portions in engagement therewith and wherein the said of the portions of the engagement on the rotatable member is spaced from the stylus tip.

8. A measurement device as claimed in claim 7 wherein the movable member is rotatably repositionable into a plurality of repeatable positions relative to the joint repositioner.

9. A measurement device as claimed in claim 8 wherein the joint allows the movable member to be repositionable into the said plurality of repeatable positions in two rotational axes.

10. A measurement device as claimed in claim 7 wherein the said other one of the portions of the engagement comprises a spherical surface and the holder comprises a spherical surface accepting area.

11. A measurement device as claimed in claim 10 wherein the spherical surface is formed on the rotatable member and the holder is formed on the first part.

12. A measurement device as claimed in claim 11 wherein the holder includes a vacuum conduit.

13. A measurement device as claimed in claim 10 wherein the spherical surface is formed on the first part and the holder is formed on the rotatable member.

14. A measurement device as claimed in claim 7 wherein the joint allows the movable member to be repositionable into the said plurality of repeatable positions in two rotational axes.

15. A method of reorientating a measurement device mounted to a coordinate measurement machine, the coordinate measurement machine having:
- a first part and a second part being movable relative to the first part; and
- a first portion of an engagement;

the measurement device having:
- a stylus and a stylus tip;
- a joint for interconnecting the stylus with the second part and for reorientating the stylus;
- the measurement device further comprising a second portion of an engagement for mutual engagement with the first portion;
- one of the two portions of the engagement comprising a holder for holding the other one of the said portions in engagement therewith, the second portion of the engagement being spaced from the stylus tip, the method comprising:
- moving the first and second parts in order to engage the first and second portions of the engagement;
- moving the second part relative to the first part in a path centred on the engagement thereby to reposition the stylus relative to the first and second parts; and
- disengaging the first and second portions of the engagement by relative movement of the first and second parts.

16. A method as claimed in claim 15 wherein the joint allows the repositioning of the stylus into a plurality of repeatable positions relative to the second part.

17. A method as claimed in claim 16 including the step of: unlocking the joint to allow its repositioning.

18. A method as claimed in claim 15 including the step of: unlocking the joint to allow its repositioning.

* * * * *